Figure 1:
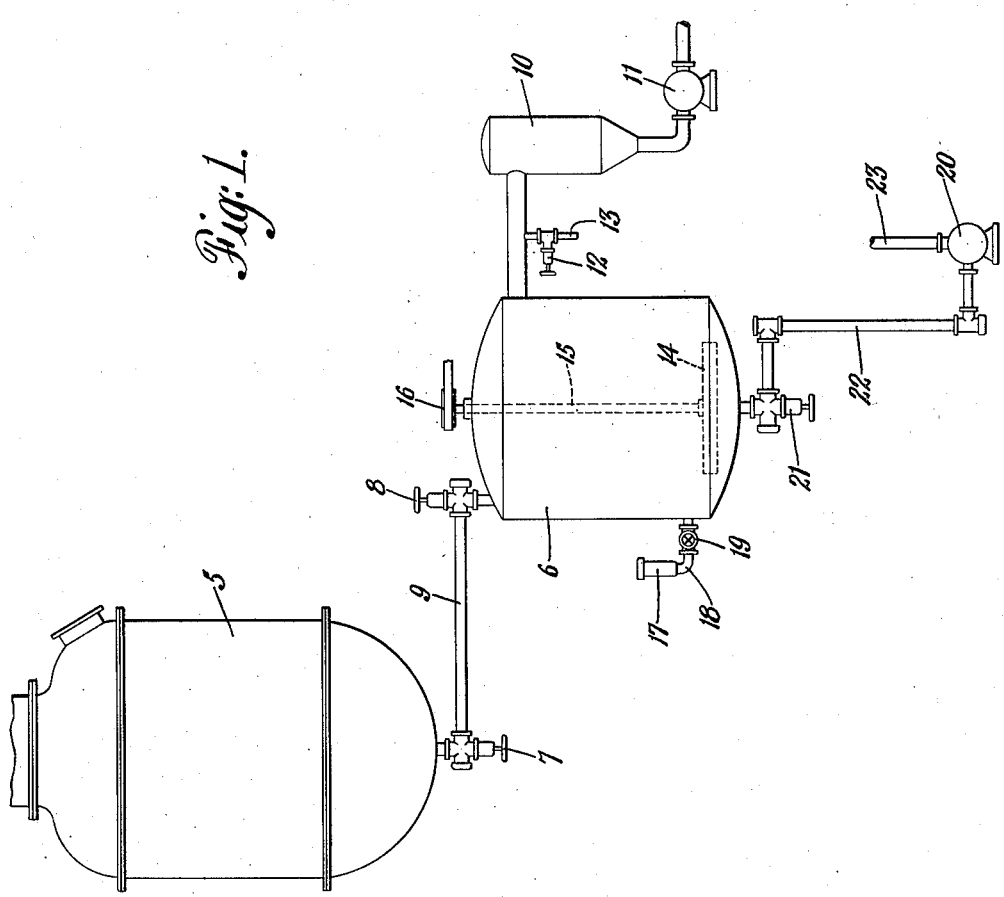

Aug. 7, 1945.   P. T. LEMMEL ET AL   2,381,761
PREPARATION OF CONCENTRATED FLUID MILK PRODUCTS
Filed March 16, 1942   2 Sheets-Sheet 2

*Fig. 2.*

INVENTOR
PAUL T. LEMMEL
HUGH P. FELL
BY
W. Philip Churchill
ATTORNEY

Patented Aug. 7, 1945

2,381,761

UNITED STATES PATENT OFFICE 2,381,761

PREPARATION OF CONCENTRATED FLUID MILK PRODUCTS

Paul T. Lemmel, Madison, Wis., and Hugh P. Fell, New York, N. Y., assignors to The Borden Company, New York, N. Y., a corporation of New Jersey Application March 16, 1942, Serial No. 434,802

5 Claims. (Cl. 99—55)

This invention relates to the preparation of concentrated fluid milk products, and more particularly to a process for producing condensed milk products with good keeping qualities that contain any sugar in excess of its solubility in the form of extremely minute uniform crystals.

In the ordinary preparation of condensed milk, the mix consists of fluid milk with cane or beet sugar added thereto in the proper ratio and standardized to provide in the final product the desired ratio of fat, milk solids-not-fat and sugar. This mix is heated in a vacuum pan to evaporate water leaving approximately the quantity of water desired in the final product. This concentrated or condensed milk product, which is very viscous, is then pumped through tubular coolers into a separate chamber where seed crystals of sugar are added and crystallization occurs. When the condensed milk is first cooled, the sugar is really held in the form of a super-saturated solution, so that it is desirable to have the excess sugar crystallized rapidly to avoid the formation of large crystals.

This process has had numerous disadvantages for many years, one of which is the difficulty of controlling the crystallization to produce very small sugar crystals in the product without agitating the product to such a degree that large quantities of air are beaten into the mix. If too much air is thus incorporated, it is deleterious to the keeping qualities of the product. In addition, the thick condensed milk from the vacuum pan coats the tubes of the cooler in such a manner that cooling is interfered with, and usually there is a central warm core of the product flowing through the cooling tubes that makes regulation of the cooling and control of the crystallization very difficult. A further difficulty with the process heretofore used has been the necessity for using high pressure pumps that are required for handling the product because of the high viscosity of the material being handled.

It is an object of our invention to provide a process of preparing concentrated fluid milk products overcoming the foregoing disadvantages.

A particular object of our invention is to provide a process in which the seeding and crystallization of the concentrated product is carried out with severe agitation under a very low pressure.

A further object of the invention is to provide a process in which evaporation of the product in the vacuum pan is arrested before the concentration has been completed, and in which the product is cooled to a crystallizing temperature by subjecting it to a lowered pressure producing the evaporation of the additional water.

A further object of the invention is the preparation of a condensed milk product by either a batch or continuous process in which the product is cooled to a crystallizing temperature by application of a high vacuum, is seeded and crystallized while under this high vacuum, and is then cooled to a storage temperature by means of a higher degree of vacuum.

Two embodiments of our invention will be described as illustrative thereof in conjunction with apparatus shown in the accompanying drawings, in which Fig. 1 is a diagrammatic view of apparatus suitable for carrying out this process by batch operation.

Figure 2:
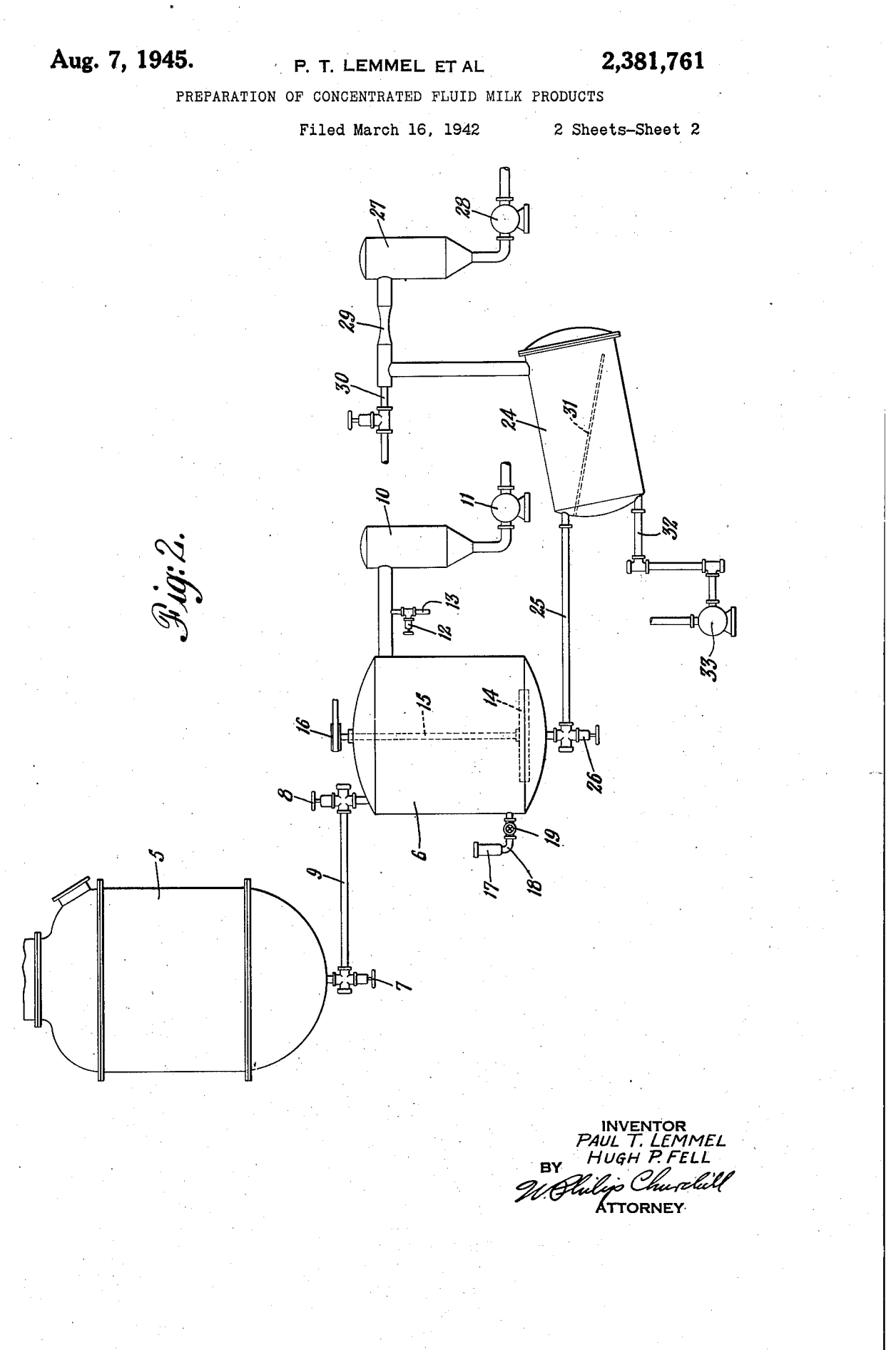

Fig. 2 is a diagrammatic view of apparatus suitable for carrying out our process continuously.

Referring to the apparatus illustrated in Figs. 1 and 2 of the accompanying drawings, numeral 5 in each figure indicates a vacuum pan or other conventional or suitable type of evaporating equipment for concentrating fluid milk products by evaporation of water at temperatures above 100° F., usually of the order of 120 to 145° F. The fluid milk product mix is prepared with an adjusted composition, usually by adding cane or beet sugar, so that it will have the desired ratio of fat, milk solids-not-fat, and carbohydrate after the evaporation of given quantity of water. This mix is placed in the vacuum pan 5 and evaporated under a partial vacuum to a point short of the complete concentration desired, i. e., the mix is left with about 3 to 5 lbs. of additional water per 100 lbs. of finished product. The amount of extra water left in the product will depend principally upon the temperature of operation of the vacuum pan because this in turn will govern the amount of cooling that will be required in subsequent stages of the operation.

This evaporated mix is now drawn off into the vacuum tank 6 by opening the valves 7 and 8 in the connecting pipe line 9. Tank 6 is maintained under a substantially lower pressure than the vacuum pan 5. Condenser 10 and vacuum pump 11 may be used for this purpose and may be of any conventional or other suitable design for maintaining in the tank 6 an extremely low pressure, preferably a pressure of about 12 to 16 mm. of mercury absolute which is sufficient to cool a product of this character to 70 to 75° F. When the concentrated product is drawn into the tank 6, however, the valve 12 in the bleeder line 13 open to the atmosphere, is preferably open a slight amount so that the degree of vacuum in the tank 6 is only sufficient to cool the product down below 100° F. to a suitable crystallizing temperature. For most purposes this may be a temperature ranging from 85 to 95° F. produced by an absolute pressure of about 24 to 33 mm. of mercury. The condensed milk product, as it comes into the tank 6, therefore, is cooled by the evaporation of additional quantities of water due to the lower pressure in the tank 6 than that in the vacuum pan 5.

When the concentrated product has all been drawn into the tank 6, the valve 8 is closed, and the agitator 14, which may be mounted on a shaft 15 and driven by the belt and pulley 16 from any suitable source of power (not shown), is started. This agitator 14 is preferably rotated at a fairly high rate of speed to produce severe agitation of the cooled product. The actual speed of the agitator will, of course, depend upon the specific design and shape of the agitator blades employed.

Seed crystals of lactose or other suitable sugar are now placed in the seeding cup 17 which is connected by means of the pipe 18, provided with a valve 19, to the lower portion of tank 6, and these crystals may be introduced into the fluid mix by quickly opening and shutting the valve 19. Because the product is under low pressure, it may be agitated by rotating the agitator 14 at a very high speed without beating substantial quantities of air into the product. As the seed crystals are introduced through the pipe 18, crystallization of the excess sugar takes place and by reason of the high degree of agitation, these crystals are extremely minute in form.

Referring now to the apparatus illustrated in Fig. 1, when the crystallization of the product has been substantially completed, the valve 12 may be closed and the pressure in the tank 6 drops further, producing further evaporation of water and reducing the temperature of the product in the tank 6 to suitable storage temperature, for example, around 70 to 75° F. As soon as the product has cooled to this storage temperature, the vacuum in tank 6 is broken completely, as by shutting off the vacuum pump and opening valve 12.

The pump 20, which may be an ordinary type of sanitary delivery pump, is now started and the valve 21 in pipe 22 is opened so that the finished product can be pumped to storage through the line 23.

When the tank 6 is empty, the valve 21 may be closed, the bleeder valve 12 adjusted to a slightly open position, the vacuum pump and condenser started, and the tank is then ready in a short time to receive another batch of concentrated product from the vacuum pan 5.

If desired, this process may be carried out continuously without breaking the vacuum in the tank 6 each time a finished batch is drawn off. Apparatus suitable for such operation is illustrated in Fig. 2 and includes a second vacuum tank 24 connected to the bottom of tank 6 by the pipe 25 provided with valve 26. In the operation of this apparatus, the bleeder valve 12 is left open a slight amount to avoid lowering the temperature of the product in tank 6 to a point substantially below 85° F. When the crystallization of the product in tank 6 is substantially completed as described above, valve 26 is opened slightly, and because of the lower pressure in tank 24, the product will flow through the pipe 25 into the tank 24.

Tank 24 may be connected to a suitable condenser 27 with a vacuum pump 28 and provided, if desired, with a steam injector or booster 29 supplied with steam through the pipe 30. Any suitable equipment may be used to maintain a vacuum in the tank 24 sufficient to cool the product by evaporation of water to a temperature of about 70 to 75° F.

We prefer to arrange the tank 24 in an inclined position with a baffle plate 31 mounted inside the tank and inclined downwardly from the end of pipe 25. As the product flows into the tank 24, it is spread out in the form of a thin layer flowing down over baffle 31 and is promptly cooled by evaporation of water in the lower pressure existing in tank 24. The cooled product running off the lower end of baffle plate 31 flows back down the inclined side wall of the tank to the pipe 32 and is withdrawn therefrom by the pump 33 to storage.

This apparatus can, of course, be operated to prepare the product in batches. However, if the valve 26 is opened only part way, so that the product in tank 6 is almost but not completely drawn off by the time a new batch of product is ready in the vacuum pan 5, a continuous flow of cooled product may be maintained into the tank 24, and thence to storage, even though the product is evaporated one batch at a time in the vacuum pan 5.

This equipment illustrated in Fig. 2 has additional advantages in that it is unnecessary to break the vacuum in the tank 6 after each batch of product is crystallized, and also it provides for the rapid cooling of the product after crystallization by exposing it in thin layers to the final degree of low pressure maintained in tank 24.

By our process, the preparation of concentrated fluid milk products is not only simplified and made easier to control, but the product is also improved substantially. The mix is heated in the vacuum pan for a shorter time which results in an improved flavor, and the sugar crystals in the product are exceedingly uniform and very minute in size.

Our process also eliminates the use of tubular or other types of contact coolers and high pressure pumps which saves space and expense along with the necessity for cleaning this extra equipment at frequent intervals.

The specific temperature and pressure ranges given above are given by way of example and are not intended as limitations on the operation of the process. For example, it is apparent that the finished product may be cooled to a temperature below 70° F., if desired, before pumping it to storage. Also other crystallization temperatures may be used as long as they are low enough to produce a supersaturated solution of sugar.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A process of preparing a concentrated fluid milk product comprising concentrating a milk product containing added sugar by heating said milk product at a temperature above 100° F. under partial vacuum, cooling by evaporation the resulting product to a temperature between 70° F., which corresponds to 12.0 mm. of mercury, and 95° F. which corresponds to 33 mm. of mercury, and simultaneously during said cooling period agitating severely said resulting product.

2. A process of preparing a concentrated fluid milk product comprising concentrating a milk product containing added sugar by heating said milk product at a temperature between 120° F. and 145° F. under partial vacuum, cooling by evaporation the resulting product to a temperature between 70° F. and 95° F. by maintaining a high vacuum and during said cooling period agitating the resulting product and adding thereto crystals of a seeding sugar that promote crystallization of the milk sugar in extremely fine crystals and further cooling said product to a suitable storage temperature.

3. In the process of preparing a fluid condensed milk the step comprising transferring the condensed product after heating in a vacuum pan to a vacuum tank maintained at an absolute pressure corresponding to 24 to 33 mm. of mercury to cool said product and during said cooling agitating the mixture in said tank severely to promote the formation of minute milk sugar crystals.

4. A process of preparing a concentrated milk product comprising concentrating a milk product containing added sugar by heating said milk product at a temperature between 120° F. and 140° F. under partial vacuum until the mixture contains 3 lbs. to 5 lbs. of water per 100 lbs. of finished product more than desired in said finished product, cooling by evaporation the resulting product to a temperature between 85° F. and 95° F. by maintaining it at an absolute pressure corresponding to 24 to 33 mm. of mercury, and during said cooling period agitating said resulting product and adding thereto crystals of a seeding sugar to stimulate crystallization of the milk sugar in extremely fine crystals.

5. A process of preparing a fluid condensed milk product comprising condensing a fluid milk product containing added sugar at a temperature above 100° F., cooling by evaporation the resulting product to a temperature between 70° and 95° F. by maintaining it at an absolute pressure corresponding to 12 to 33 mm. of mercury, severely agitating said product during the cooling period to promote crystallization of the milk sugar in extremely fine crystals and thereafter subjecting said product in the form of a thin layer to a vacuum sufficient to cool the product to a temperature suitable for storage.

PAUL T. LEMMEL.
HUGH P. FELL.